UNITED STATES PATENT OFFICE.

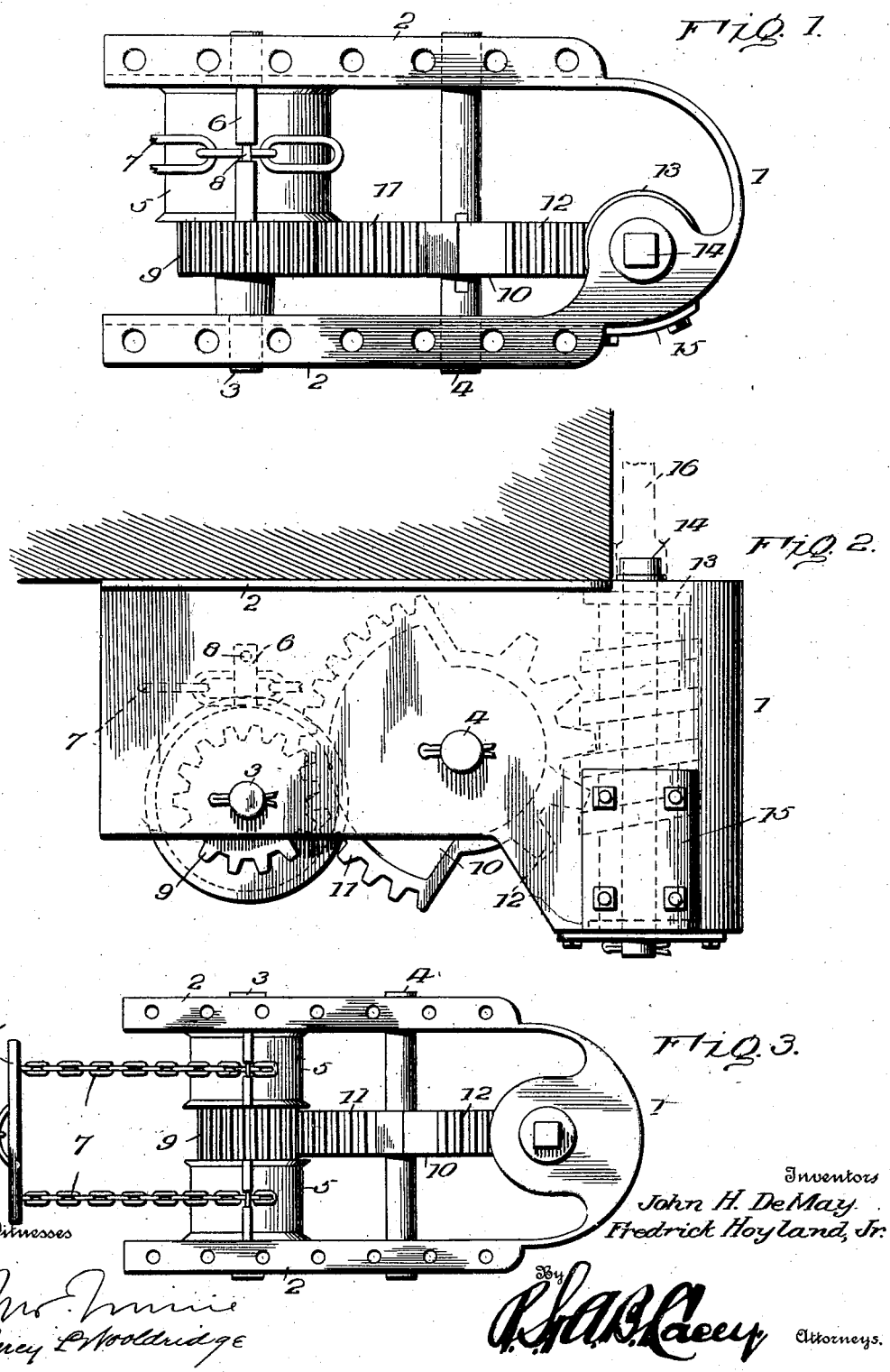

JOHN H. DE MAY AND FREDRICK HOYLAND, JR., OF JACKSON, MICHIGAN.

CAR-BRAKE.

SPECIFICATION forming part of Letters Patent No. 709,884, dated September 30, 1902.

Application filed January 29, 1902. Serial No. 91,800. (No model.)

*To all whom it may concern:*

Be it known that we, JOHN H. DE MAY and FREDRICK HOYLAND, Jr., citizens of the United States, residing at Jackson, in the county of Jackson and State of Michigan, have invented certain new and useful Improvements in Car-Brakes; and we do hereby declare the following to be a full, clear, and exact description of the invention, such as will enable others skilled in the art to which it appertains to make and use the same.

This invention has relation to operating means for manually setting the brakes of rolling-stock, such as freight-cars and like carriers, the purpose being to enable the brakes being quickly and firmly applied when required.

Inasmuch as the invention is particularly designed for use in connection with freight-cars, it is so illustrated, although within the purview of the invention it may be applied wherever it is required to set a brake either by hand or other power.

With these ends in view and such others as appertain to the nature of the invention the latter consists of the novel features and details of construction which hereinafter will be more particularly set forth, illustrated, and finally claimed.

In the accompanying drawings, forming a part of the specification, Figure 1 is a top view of a brake-setting mechanism embodying the essential features of the invention. Fig. 2 is a side view thereof, showing an end portion of a freight-car. Fig. 3 is a top view of a modification.

Corresponding and like parts are referred to in the following description and indicated in all the views of the drawings by the same reference characters.

The frame 1, supporting the working parts, is approximately of U form and is provided with lateral flanges 2 along its upper longitudinal edges for attachment of the mechanism to the platform or other structure to which the mechanism is to be applied, said flanges being apertured to receive the bolts or fastenings whereby the frame is secured when in place. Shafts 3 and 4 are disposed in parallel relation and are journaled at their ends in the side portions of the frame 1. A drum 5 is mounted upon the shaft 3 so as to turn therewith and has an offstanding portion 6, notched to receive a link of the chain 7, by means of which power is transmitted to the brake-beam when it is required to apply the brake. The open end of the notch formed in the part 6 is closed by a pin 8, which prevents outward displacement of the link when placed within the notch. A pinion 9 is mounted upon the shaft 3, so as to rotate therewith and with the drum 5.

A gear element 10 is keyed to the shaft 4 and is provided with toothed portions 11 and 12 of different radius, the teeth 11 being in mesh with the pinion 9 and the teeth 12 intermeshing with a worm 13, journaled vertically near the outer end of the frame 1. The teeth 12 are formed on a smaller circle than the teeth 11. Hence movement imparted to the toothed portion 12 is augmented by the toothed portion 11. The gear element 10 by reason of its construction and function may be properly designated as a "differential-speed" gear. The worm 13 is journaled at its upper end in a bearing 14, extended inward from a side of the frame near its front end and in a bearing 15, bolted or otherwise secured to the lower portion of the side having the bearing 14, the bearings 14 and 15 being in vertical alinement. The brake-setting shaft 16 may be fitted to the worm 13 or form a part thereof and is adapted to be operated in the usual way.

In the construction shown in Fig. 3 the shaft 3 is provided with two drums 5, and the pinion 9 is located between the inner ends of said drums, thereby equalizing the strain upon both ends of the shaft and frame. The draft-chains 7, connected at one end with the drums 5, have connection at the opposite end with a beam 17, to which a chain 18 is centrally attached for transmitting the force to the brake to be set.

The effective length of the chain 7 may be regulated by fitting a link thereof into the notch of the offstanding part 6 of the drum 5, the link being held in place by the pin 8. Upon turning the shaft 16 the worm 13 is rotated and effects a turning of the differential-speed gear 10 and a rotation of the drum 5, whereby the chain 7 is wound thereon and the brake applied, as will be readily comprehended.

Having thus described the invention, what is claimed as new is—

1. In brake-setting mechanism, a drum adapted to be connected with the brake to be applied, a pinion connected for rotation with the drum, a worm, a brake-setting shaft for actuating the said worm, and a differential-speed gear having its toothed portions in mesh with, respectively, the said worm and pinion, substantially as set forth.

2. In brake-setting mechanism, a frame of approximately U form, parallel shafts journaled in the longitudinal or side portions of the frame, a drum secured to the innermost shaft, a differential-speed gear keyed to the other shaft and having the toothed portion of greater diameter in mesh with the teeth of a pinion connected for rotation with the said drum, and a worm-gear in mesh with the other toothed portion of the differential-speed gear and journaled at a right angle to the aforementioned shaft, substantially as set forth.

3. In brake-setting mechanism, a frame, parallel shafts, spaced drums secured to one of the shafts, a pinion intermediate of the drums and connected for rotation therewith, a differential-speed gear mounted upon the other shaft and in mesh with the said pinion, and a drive worm-gear in mesh with a toothed portion of the differential-speed gear, substantially as set forth.

In testimony whereof we affix our signatures in presence of two witnesses.

JOHN H. DE MAY. [L. S.]
FREDRICK HOYLAND, JR. [L. S.]

Witnesses:
JOS. WEINHOLD,
L. A. HARMON.